US012727704B2

(12) United States Patent
Rossetto et al.

(10) Patent No.: US 12,727,704 B2
(45) Date of Patent: Sep. 8, 2026

(54) DEVICE FOR PREPARING A DOSE OF GROUND COFFEE POWDER

(71) Applicant: DE' LONGHI APPLIANCES S.r.l., Treviso (IT)

(72) Inventors: Giovanni Rossetto, Treviso (IT); Massimo Poggioli, Treviso (IT); Alessandro Bellese, Treviso (IT); Roberto Sanson, Treviso (IT)

(73) Assignee: DE' LONGHI APPLIANCES S.r.l., Treviso (IT)

(*) Notice: Subject to any disclaimer, the term of this patent is extended or adjusted under 35 U.S.C. 154(b) by 812 days.

(21) Appl. No.: 18/042,936

(22) PCT Filed: Aug. 25, 2021

(86) PCT No.: PCT/EP2021/073459

§ 371 (c)(1),
(2) Date: Feb. 24, 2023

(87) PCT Pub. No.: WO2022/048960

PCT Pub. Date: Mar. 10, 2022

(65) Prior Publication Data

US 2023/0320517 A1 Oct. 12, 2023

(30) Foreign Application Priority Data

Sep. 2, 2020 (IT) ........................ 102020000020896

(51) Int. Cl.
*A47J 31/06* (2006.01)
*A47J 31/42* (2006.01)
*A47J 42/40* (2006.01)

(52) U.S. Cl.
CPC ....... *A47J 31/0663* (2013.01); *A47J 31/0631* (2013.01); *A47J 31/42* (2013.01); *A47J 42/40* (2013.01)

(58) Field of Classification Search
CPC .... A47J 31/0663; A47J 31/0631; A47J 31/42; A47J 42/40
(Continued)

(56) References Cited

U.S. PATENT DOCUMENTS 203,178 A * 4/1878 Miller ..................... A47J 31/02 99/306
3,232,213 A * 2/1966 Valente ............... A47J 31/4467 99/302 R (Continued)

FOREIGN PATENT DOCUMENTS

DE 102014204483 B3 * 6/2015 .......... A47J 31/3614
EP 1050259 A1 * 11/2000 .............. A47J 31/36
WO WO-2019058267 A1 * 3/2019 .............. A47J 42/20

OTHER PUBLICATIONS

International Search Report and Written Opinion dated Oct. 15, 2021, from International Application No. PCT/EP2021/073459.

*Primary Examiner* — Jimmy Chou
(74) *Attorney, Agent, or Firm* — Troutman Pepper Locke LLP

(57) ABSTRACT

The device for preparing a dose of ground coffee powder ready for infusion comprises a cup provided with a gripping handle and housing a filter containing said dose of ground coffee powder, a coupling support in which the cup is coupled separably, and a pressing piston that is engageable in the filter for pressing the dose of ground coffee powder, the pressing piston having anti-detachment means configured to prevent the detachment of the pressed dose of ground coffee powder from the walls of the filter when the pressing piston disengages the filter.

16 Claims, 9 Drawing Sheets

(58) Field of Classification Search
USPC .......................................................... 99/279
See application file for complete search history.

(56) References Cited

U.S. PATENT DOCUMENTS 4,882,982 A * 11/1989 Muttoni .............. A47J 31/0605 99/295
5,526,733 A * 6/1996 Klawuhn ............ A47J 31/3671 99/287
5,913,962 A * 6/1999 Gasser ................ A47J 31/4496 99/302 R
6,220,147 B1 * 4/2001 Priley ................. A47J 31/4496 99/305
10,349,772 B1 * 7/2019 Fedele .................... A47J 31/06
11,103,104 B2 * 8/2021 Bakke ..................... A47J 31/54
11,497,343 B2 * 11/2022 Kuempel ............ A47J 31/0605
11,812,887 B2 * 11/2023 Nista ....................... A47J 31/44
12,053,114 B1 * 8/2024 Brown .................... A47J 31/38
12,502,020 B2 * 12/2025 Tollefsbol ............... A47J 31/38
2003/0070979 A1 * 4/2003 Huang .................... A47J 31/20 99/279
2006/0156928 A1 * 7/2006 Wang ...................... A47J 31/60 99/280
2007/0227363 A1 * 10/2007 Verna ...................... A47J 31/54 99/279
2007/0277676 A1 * 12/2007 Crivellin ................. A47J 31/38 99/288
2009/0260522 A1 * 10/2009 Brine .................. A47J 31/0663 99/298
2010/0236420 A1 * 9/2010 Remo ................. A47J 31/0657 99/299
2011/0048243 A1 * 3/2011 Bambi .................. A47J 31/002 99/300
2011/0100228 A1 * 5/2011 Rivera ................ A47J 31/0647 99/295
2011/0209623 A1 * 9/2011 Leung ..................... A47J 31/44 99/287
2013/0213240 A1 * 8/2013 O'Brien .................. A47J 31/38 99/297
2014/0090565 A1 * 4/2014 Yang .................. A47J 31/0663 99/323
2015/0250354 A1 * 9/2015 Ceotto ................ A47J 31/5255 99/281
2016/0128507 A1 * 5/2016 Grassia ................... A47J 31/44 99/287
2016/0157661 A1 * 6/2016 Torquemada ....... A47J 31/0657 99/323
2016/0166103 A1 * 6/2016 Morse ..................... A47J 31/20 99/297
2016/0270588 A1 * 9/2016 Ceotto .................... A47J 31/44
2016/0287005 A1 * 10/2016 Ceotto ................ A47J 31/0626
2016/0296061 A1 * 10/2016 Psarologos ............. A47J 31/42
2016/0316960 A1 * 11/2016 Poggioli ............. A47J 31/4464
2017/0325622 A1 * 11/2017 Rossetto ................... A23F 5/26
2018/0153330 A1 * 6/2018 Abbiati ................... A47J 31/44
2018/0153332 A1 * 6/2018 Abbiati ................... A47J 42/40
2018/0192811 A1 * 7/2018 Dionisio ................. A47J 31/38
2018/0220838 A1 * 8/2018 Guo .......................... A23F 5/24
2018/0360257 A1 * 12/2018 Dionisio ................. A47J 31/38
2018/0368607 A1 * 12/2018 Wang .................. A47J 31/4467
2019/0142210 A1 * 5/2019 De'Longhi ........... A47J 31/469 99/279
2021/0120998 A1 * 4/2021 De'Longhi ............. A47J 31/44
2021/0204748 A1 * 7/2021 Della Pietra .......... A47J 31/303
2022/0240711 A1 * 8/2022 Hellmers .............. A47J 31/525
2024/0081583 A1 * 3/2024 Rossetto ................. A47J 42/40

* cited by examiner 103
15d
15
103
15a
15c
102
104

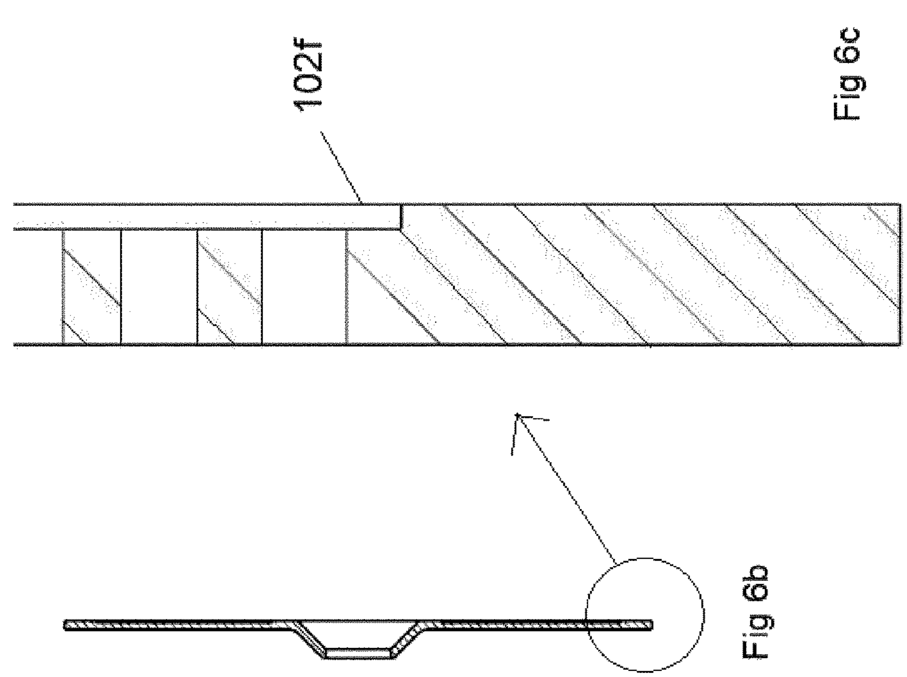
102f
Fig 6c
Fig 6b
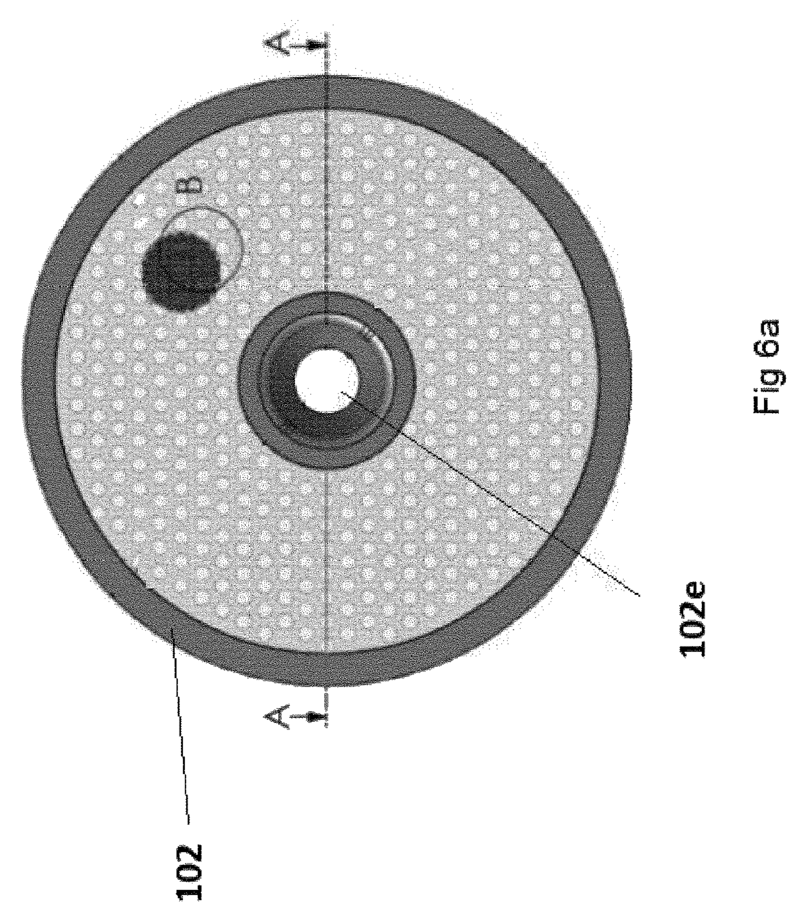
A
B
A
102e
102
Fig 6a

DEVICE FOR PREPARING A DOSE OF GROUND COFFEE POWDER

CROSS REFERENCE TO RELATED APPLICATIONS

The present application is a U.S. National Phase application under 35 U.S.C. § 371 of International Patent Application No.: PCT/EP2021/073459 filed Aug. 25, 2021, which claims priority of Italian Patent Application No. 102020000020896 filed Sep. 2, 2020. The entire contents of both applications are hereby incorporated by reference.

FIELD OF THE INVENTION

This invention relates to a device for preparing a dose of ground coffee powder ready for infusion.

BACKGROUND

This device of known type generally comprises a pressing piston and a cup provided with a gripping handle and housing a filter having delimiting walls delimiting an open chamber for collecting the dose of ground coffee powder.

The cup is releasably coupled with a support and receives the pressing piston to close the open chamber delimited by the walls of the filter.

In the closing step, the dose of ground coffee powder contained in the filter is pressed.

After pressing, the cup is uncoupled from the support and coupled with the infusion head of the coffee machine.

Many of these known pressing systems often have the problem of dispersal of the coffee powder outside the cup because for pressing they require the cup to be moved from the zone of collection of the ground coffee to the pressing zone.

For this reason, systems have been proposed that implement in the same position of the cup the function of collecting the ground coffee and the pressing function.

In these systems, to avoid dispersal of the coffee powder, a conveying conduit can be provided for conveying the coffee powder that supplies the filter. The pressing piston can in this case run inside the conveying conduit and inside the filter.

A critical factor in these known devices is that the pressed dose of ground coffee may detach from the walls of the filter because of the vacuum that is generated in the gap between the piston and the pressed dose of ground coffee powder during the step of disengagement of the pressing piston from the filter and ascent along the conveying conduit.

When this occurs, there is inhomogeneous extraction of the coffee because the infusion water, instead of traversing the pressed dose of ground coffee uniformly, may find preferential paths precisely along the zone where the detachment occurred.

When preferential paths of the infusion water are established, in general also the infusion pressure falls with the inevitable consequence of a further deterioration of the organoleptic properties of the infused coffee.

SUMMARY

The technical task addressed by the present invention is accordingly to make a device for preparing a dose of ground coffee powder ready for infusion that enables the decried technical drawbacks of the prior art to be eliminated.

Within the context of this technical task, an object of the invention is to make a device of the aforesaid type that is adapted to optimize the infusion step.

Another object of the invention is to make a device of the aforesaid type adapted to reduce or eliminate dispersal of the ground coffee powder outside the filter holder cup.

Another object of the invention is to make a device of the aforesaid type adapted to simplify and accelerate pressing of the ground coffee present in the filter holder cup.

The above technical task and these and other objects according to the present invention are reached by making a device for preparing a dose of ground coffee powder ready for infusion, comprising a cup provided with a gripping handle and housing a filter containing said dose of ground coffee powder, a coupling support in which said cup is coupled separably, and a pressing piston that is engageable in said filter for pressing said dose of ground coffee powder, characterized in that said pressing piston has anti-detachment means configured to prevent the detachment of said pressed dose of ground coffee powder from the walls of said filter when said pressing piston disengages said filter.

In one preferred embodiment, said anti-detachment means comprises a filtering element that is selectively permeable to the air but not to said ground coffee.

In one preferred embodiment, said filtering element is fitted to the head of said piston.

In one preferred embodiment, said anti-detachment means further comprises air channels that terminate on the head of said pressing piston behind said filtering element.

In one preferred embodiment, said air channels are permanently connected to the outer environment at atmospheric pressure.

In one preferred embodiment, said support has a vertical cylindrical conveying conduit for conveying said dose of ground coffee to said filter.

In one preferred embodiment, said pressing piston has a scraping perimeter gasket for scraping the inner side of said vertical cylindrical conveying conduit.

In one preferred embodiment, said scraping perimeter gasket is configured to form a tight seal with the inner side of said vertical cylindrical conveying conduit and with the inner side of a cylindrical wall of said filter positioned on the axial extension downwards towards the inner side of said vertical cylindrical conveying conduit.

In one preferred embodiment, the device comprises a coffee grinder for coffee beans comprising a dispensing slide for dispensing ground coffee having an outlet in said conveying conduit.

In one embodiment, the piston can be movable to engage with and disengage from said filter whilst the cup remains stationary.

In another embodiment, the cup can be movable to engage with and disengage from said piston with said filter whilst the piston remains stationary.

In one embodiment, automatic movement means can be provided for moving said piston or said cup to engage and disengage said piston with said filter.

In another embodiment, manual movement means can be provided for moving said piston or said cup to engage and disengage said piston with said filter.

In one embodiment, the device can be integrated into a coffee machine.

In one embodiment, the device can be integrated into a standalone grinding apparatus.

In one embodiment, the pressing piston acts also as an infusion piston. Advantageously, owing to the provision of suitable anti-detachment means, the compressed dose of coffee powder adheres perfectly and uniformly to the walls of the filter until the moment in which the infusion takes place. This avoids the risk that preferential paths may be created for the infusion water with the result that the infused coffee has optimal organoleptic properties.

Advantageously, the provision of suitable anti-detachment means makes possible the use of a cup both with a double wall filter, where the risk of detachment is less because a wall of the filter has only one small calibrated hole that prevents the passage of a quantity of air sufficient to promote the detachment, and with a single-wall filter that permits better extraction of the coffee but that, having a plurality of evenly distributed holes, has a greater risk of detachment.

Other characteristics of the present invention are defined, further, in the following claims.

BRIEF DESCRIPTION OF THE DRAWINGS

Further characteristics and advantages of the invention will more fully emerge from the description of a preferred but not exclusive embodiment of the device for preparing a dose of ground coffee powder ready for infusion according to the invention, illustrated by way of indicative and non-limiting example in the accompanying figures of the drawings, in which:

FIGS. 6*a*, 6*b* and 6*c* show a plan and raised side view of the filtering element, and an enlarged detail thereof;

DETAILED DESCRIPTION

Figure 1:
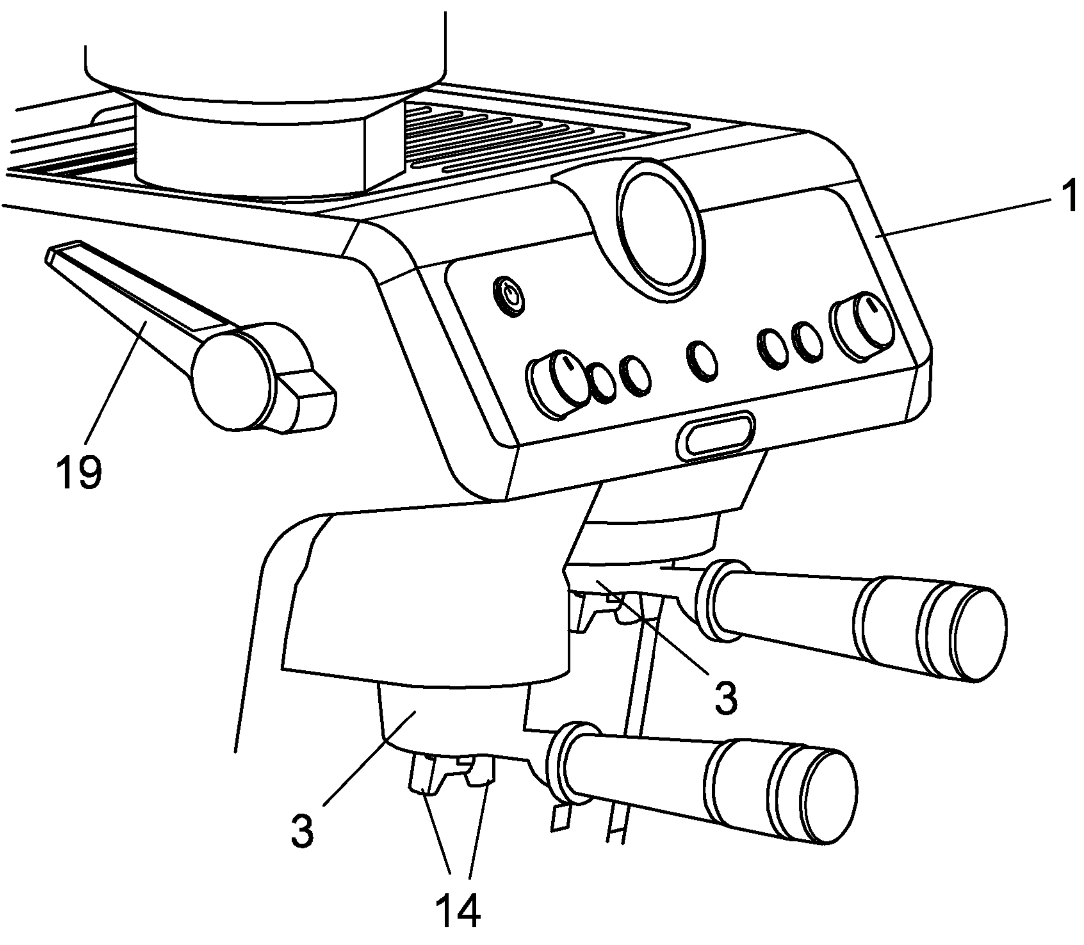
FIG. 1 shows a coffee machine that incorporates a device in accordance with an embodiment of the invention.
Figure 2:
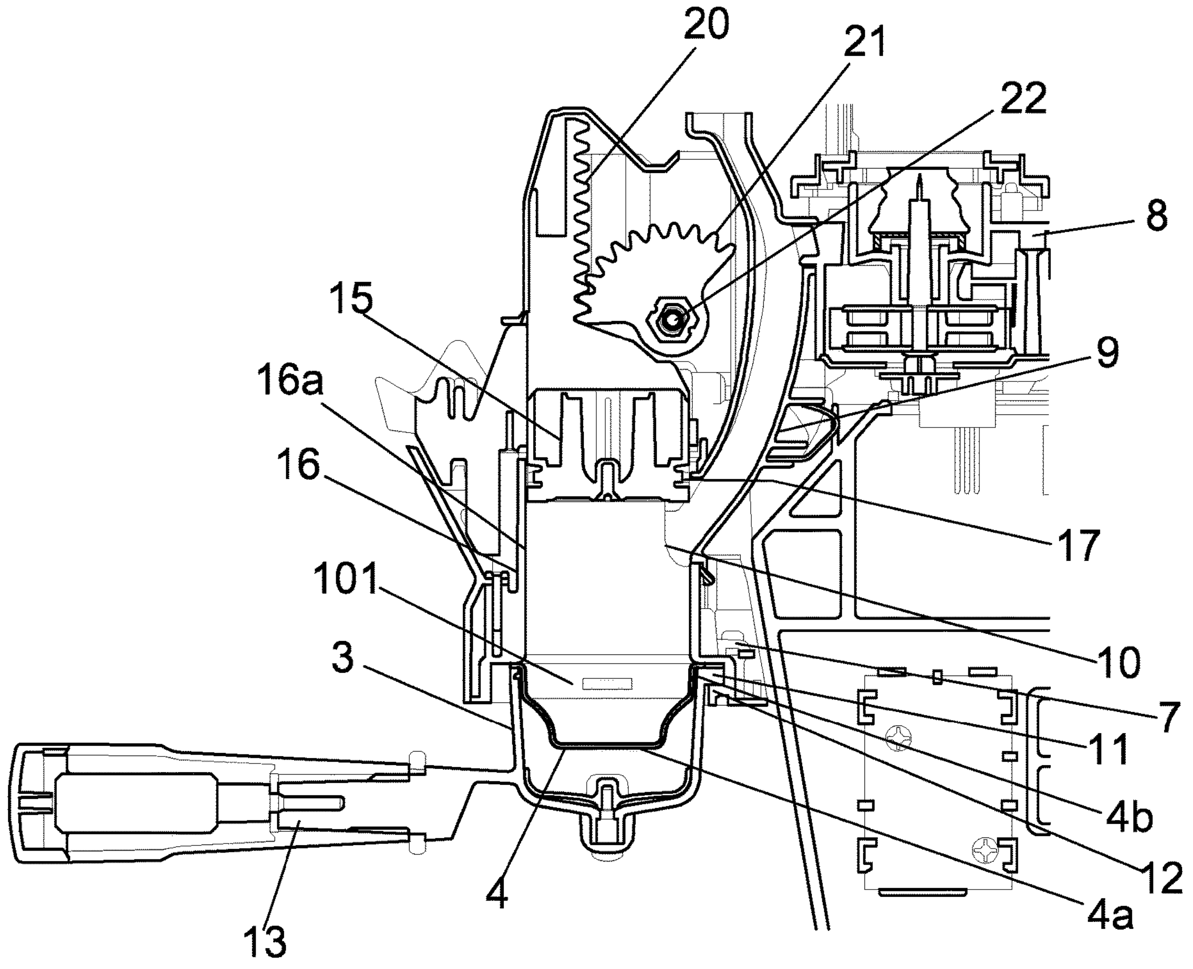
FIGS. 2 and 3 show a vertical section of the device with the pressing piston disengaged and engaged in the cup.
Figure 3:
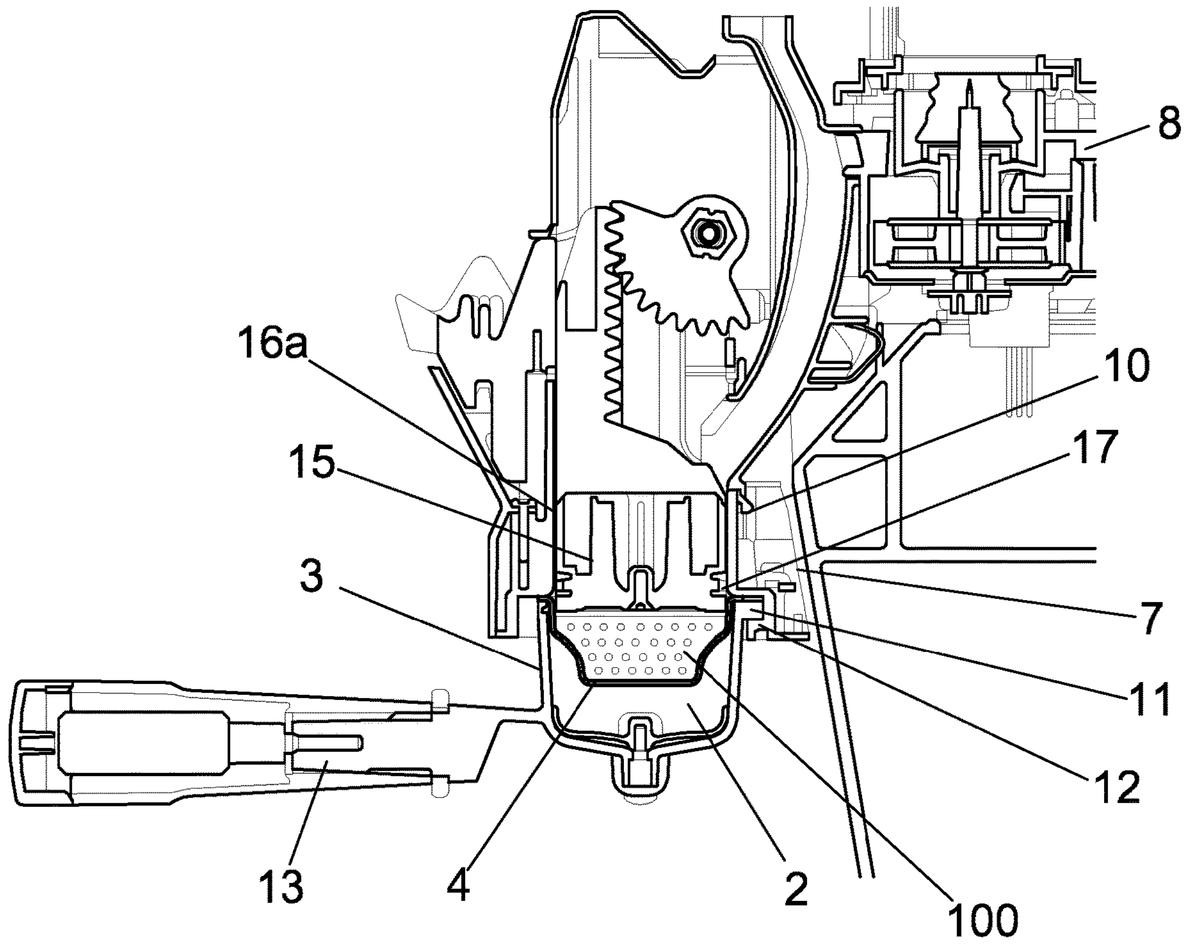
Figure 4:
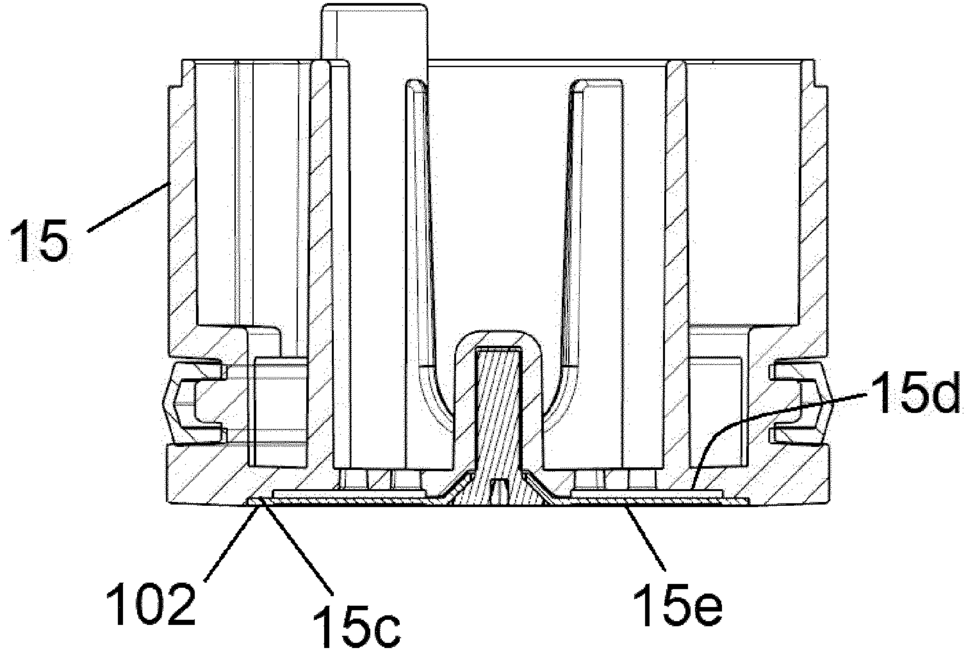
FIG. 4 shows a perspective view from below of the sectioned pressing piston.
Figure 5:
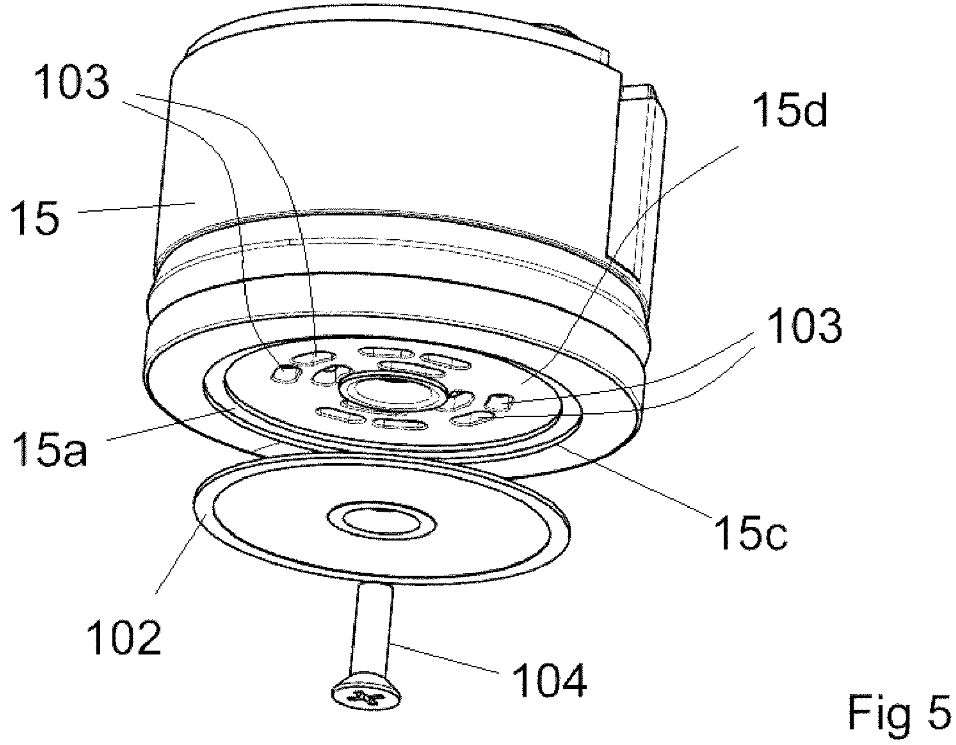
FIG. 5 shows a perspective view from below of the sectioned pressing piston with the filtering element dismantled.
Figure 7:
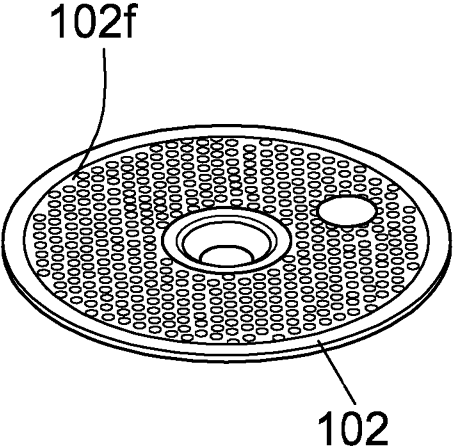
FIG. 7 shows a perspective view of the filtering element.
Figure 8:
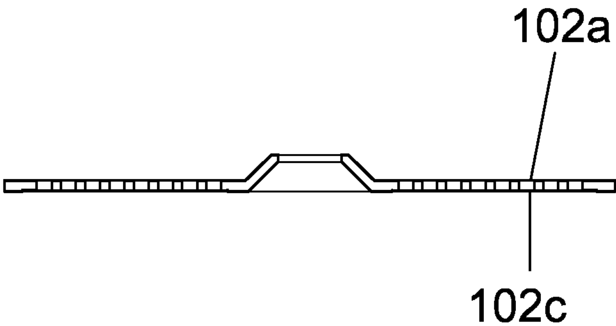
FIG. 8 shows the filtering element sectioned orthogonally along a diametric plane.
Figure 9:
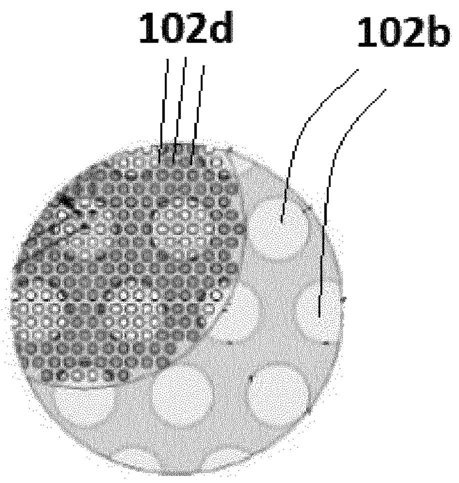
FIG. 9 shows an enlarged detail of FIG. 6.

With reference to the figures, a device 2 is illustrated for preparing a dose 100 of ground coffee powder ready for infusion.

The device 2 comprises a pressing piston 15 and a cup 3 provided with a gripping handle 13 and housing a filter 4 having delimiting walls 4*a*, 4*b* delimiting an open collecting chamber 101 for collecting the dose of ground coffee powder 100. The bottom wall 4*a* of the filter 4 has a plurality of uniformly distributed holes through which the coffee infusion passes that then flows to least one dispensing spout 14 of the infused coffee provided at the base of the cup 3.

The side wall 4*b* of the filter 4 that delimits the opening of the chamber 101 is cylindrical and has the maximum diameter of the filter 4.

The cup 3 is coupled separably with a support 7, in particular with a bayonet coupling system comprising outer fins 11 of the cup 3 that are lockable in suitable guides 12 provided in the support 7 by a roto-translation movement upwards of the cup 3.

The pressing piston 15 is engageable to close the open chamber 101 to press the dose of ground coffee powder 100.

Advantageously, the pressing piston 15 has an anti-detachment means of the pressed dose of ground coffee powder 100 from the walls 4*a*, 4*b* of the filter 4 that delimit the chamber 101.

The anti-detachment means, as will be seen better below, is operational when the pressing piston 15 disengages the filter 4.

The anti-detachment means comprises a filtering element 102 that is selectively permeable to the air but not the ground coffee present in the filter 4.

The filtering element 102 is fitted to the head 15*a* of the pressing piston 15.

The filtering element 102 specifically comprises a slightly convex flat support 102*a* having a uniform or non uniform distribution of first holes 102*b*, and a mesh 102*c* fixed to the flat support 102*a* and having a uniform or non uniform distribution of second holes 102*d* of smaller dimension than the first holes 102*b*.

The flat support 102*a* has the shape of a disk and is fixed concentrically to the head 15*a*, which is also circular in shape, of the pressing piston 15.

More precisely, the flat support 102*a* is housed in a circular recess 15*c* of joined shape provided on the head 15*a* of the pressing piston 15.

The depth of the circular recess 15*c* is equal to the thickness of the flat support 102*a*, which is thus flush with the outer surface of the head 15*a* of the pressing piston 15.

The flat support 102*a* has in turn a concentric circular recess 102*f* that houses the mesh 102*c*, which is also flat and circular and has a thickness that is less than the thickness of the flat support 102*a*.

The depth of the circular recess 102*f* is equal to the thickness of the mesh 102*c* that is thus arranged flush with the outer surface of the flat support 102*a*.

The second holes 102*d* have a diameter comprised between 0.05 mm and 0.20 mm. The diameter of the second holes 102 is less than the diameter of the grains of coffee powder that can thus not traverse the mesh 102*c*.

The first holes 102*b* have a dimension comprised between 0.8 mm and 3 mm.

The flat support 102*a* has a thickness comprised between 0.4 mm and 0.6 mm whereas the mesh 102*c* has a thickness comprised between 0.05 mm and 0.7 mm.

Centrally, the flat support 102*a* and the mesh 102*c* have a raised flared hole 102*e* for fixing the filtering element 102 by a screw 104 to the head 15*a* of the pressing piston 15.

The filtering element 102 can be made of metal, in particular stainless steel, or also of another material.

For greater dimensional precision, the calibrated holes 102*b*, 102*d* present on the filtering element 102 can be made by photo-engraving technique.

In order to assemble the mesh 102*c* on the support 102*a*, the outer perimeter edge of the mesh 102*c* can be welded continuously and the inner perimeter edge of the mesh 102*c* can be spot welded to the wall of the recess 102*f*.

Other assembly technologies for assembling the mesh 102*c* on the support 102*a* are possible, for example perimeter heading can be performed.

The anti-detachment means also comprises air channels 103 that terminate on the head 15*a* of the pressing piston 15 behind the filtering element 102. The air channels 103 can be permanently connected to the outer environment at atmospheric pressure.

Alternatively, the air channels 103 can be closed inside the pressing piston 15.

In the illustrated case, the air channels 103 terminate on the head 15*a* of the pressing piston 15, in particular at a further drop 15*d* of the bottom of the recess 15*c*.

The drop 15*d* is circular and concentric on the recess 15*c* and delimits an air chamber 15*e* precisely behind the filtering element 102.

The support 7 has a vertical cylindrical conduit 16 for conveying the dose of ground coffee powder 100 to the filter 4.

The pressing piston 15 is positioned inside the vertical cylindrical conveying conduit 16 and has a scraping perimeter gasket 17 for scraping the inner side 16*a* of the vertical cylindrical conveying conduit 16.

The scraping gasket 17 removes the coffee powder beans that remain attached to the inner side 16*a* of the vertical cylindrical conveying conduit 16 making the beans fall directly into the filter 4.

The scraping perimeter gasket 17 is configured to form a tight seal with the inner side 16*a* of the vertical cylindrical conveying conduit 16 and with the inner side of the cylindrical side wall 4*b* of the filter 4 positioned precisely on the axial downward extension of the inner side 16*a* of the vertical cylindrical conveying conduit 16. The conveying conduit 16 and the cylindrical side wall 4*b* of the chamber 101 are positioned continuously in relation to one another so as not to leave escape paths open for the coffee powder transiting to the filter 4.

Preferably, along the conveying conduit 16, an outlet 10 opens of a dispensing slide 9 of ground coffee connected to a grinder 8.

The device 2, as illustrated, can be incorporated into a coffee machine 1. Nevertheless, it must be pointed out that, unlike what has been illustrated, the device 2 can also be a structurally and functionally autonomous unit that is completely separate from the coffee machine 1.

The pressing piston 15 can even be specially structured to also act as an infusion piston.

In the solution illustrated, it is the piston 15 that is moved to perform pressing of the dose of ground coffee powder when the cup 3 is coupled with the support 7.

For this purpose, a linear movement mechanism is provided of the pressing piston 15 in the conveying conduit 16.

This mechanism is able to actuate reversibly the pressing piston 15 between a pressing position in which the pressing piston 15 is inside the cup 3 and a rest position in which the pressing piston 15 is above the outlet 10 of the slide 9.

The movement mechanism comprises a rotatable manual control lever 19 and a transmission that transforms rotation of the control lever 19 in a vertical translation of the pressing piston 15.

The pressing force exerted by the piston 15 can be regulated by elastic friction exerted by an elastic clutch that connects the lever 19 to the transmission.

The transmission can comprise specifically a gear formed by a vertical rack 20 that is solidly constrained to the pressing piston 15 and an arc of a cogwheel 21 supported rotationally by a horizontal mechanical axis 22 connected to the control lever 19 and engaging the vertical rack 20.

Naturally, it is possible to provide alternatively a non-manual but automatic or semiautomatic control of the pressing piston.

In order to perform pressing of the dose of ground coffee powder, in other solutions it is possible to provide moving of the cup 3, in particular by moving the support 7 thereof whilst the pressing piston 15 remains stationary.

The device 2 performs a work cycle comprising in sequence a first loading step of loading the dose of coffee powder into the filter 4, a second step of descent of the pressing piston 15, and a third step of lifting the pressing piston 15 above the outlet 10 of the slide 9.

In the first step of the work cycle, the pressing piston 15 is in a raised position above the outlet 10 of the slide 9.

Once the dose of ground coffee has been dispensed to the filter 4 housed in the cup 3 coupled with the support 7, the user can rotate the control lever 19 in the direction that causes vertical downward translation of the pressing piston 15 in the conveying conduit 16.

The pressing piston 15 in the initial step of the descent with the gasket 17 scrapes and cleans the inner side 16*a* of the conveying conduit 16 and in the final step of the descent engages in the filter 4 and performs pressing of the dose of ground coffee powder present in the filter 4.

Normally, before being able to uncouple the cup 3 from the support 7 and being thus able to couple the cup 3 with the end of the infusion unit of the coffee machine 1, the pressing piston 15 is returned to the initial position raised above the outlet 10 of the slide 9.

During the ascent of the pressing piston 15, a progressively growing volume opens between the head 15*a* of the pressing piston 15 and the pressed dose of ground coffee powder present in the filter 4.

During the ascent of the pressing piston 15, the gasket 17 of the pressing piston 15 further creates a tight seal against the cylindrical wall 16*a* of the conveying conduit 16.

Despite the seal exerted by the gasket 17, in this space of constantly increasing volume no persistent vacuum is created that, if present, could generate significant upward suction force on the pressed dose of ground coffee powder.

In fact, as the volume of said space increases, the decrease of inner pressure is promptly compensated by the inflow of air thereinto drawn through the air channels 103 and the filtering element 102.

The pressed dose of ground coffee powder does not therefore detach from the walls 4*a*, 4*b* of the filter 4 and does not promote the formation of preferential paths of the water through the detachment zones during infusion.

In practice, with the present invention a device is provided that, without dirtying, enables a dose of ground coffee powder to be loaded and pressed correctly in the filter 4 of the cup 3 ready to be subjected to a correct infusion procedure.

The device thus conceived is susceptible of numerous modifications and variants falling within the scope of the inventive concept; moreover, all the details are replaceable by technically equivalent elements.

In practice, the materials used, as well as the dimensions, can be any according to the needs and the state of the art.

The invention claimed is:

1. A device for preparing a dose of ground coffee powder ready for infusion, comprising:

a cup provided with a gripping handle and housing a filter containing said dose of ground coffee powder, a coupling support in which said cup is coupled separately, and a pressing piston that is engageable in said filter for pressing said dose of ground coffee powder, wherein said pressing piston is configured to prevent the detachment of said pressed dose of ground coffee powder from walls of said filter when said pressing piston disengages said filter, wherein the pressing piston further comprises:

a filtering element that is selectively permeable to the air but not to said ground coffee powder, wherein said filtering element is fitted to a head of said pressing piston, and air channels in said pressing piston that terminate on the head of said pressing piston behind said filtering element, wherein said air channels are permanently connected to the outer environment at atmospheric pressure.

2. The device according to claim 1, wherein said support comprises a vertical cylindrical conveying conduit conveying said dose of ground coffee powder to said filter.

3. The device according to claim 2, wherein said pressing piston is positioned inside said vertical cylindrical conveying conduit and comprises a scraping perimeter gasket on the inner side of said vertical cylindrical conveying conduit.

4. The device according to claim 3, wherein said scraping perimeter gasket is configured to form a seal with the inner side of said vertical cylindrical conveying conduit and with the inner side of a cylindrical wall of side filter positioned on a downward axial extension of the inner side of said vertical cylindrical conveying conduit.

5. The device according to claim 2, further comprises a coffee grinder for coffee beans comprising a dispensing slide dispensing ground coffee having an outlet into said conveying conduit.

6. The device according to claim 1, wherein said filtering element comprises a flat support having a distribution of first holes and a mesh fixed to the flat support and having a distribution of second holes of a lesser dimension than the first holes.

7. The device according to claim 6, wherein said second holes have a diameter comprised between 0.05 mm and 0.20 mm.

8. The device according to claim 1, wherein said pressing piston is movable to engage with and disengage from said filter.

9. The device according to claim 1, wherein said cup is movable to engage and disengage said pressing piston with and from said filter.

10. The device according to claim 9, wherein at least one of a manual or an automatic actuator is operatively associated with at least one of said pressing piston or said cup configured to engage and disengage said pressing piston with and from said filter.

11. A coffee machine comprising the device preparing a dose of ground coffee powder according to claim 1.

12. A device for preparing a dose of ground coffee powder ready for infusion, comprising: a cup provided with a gripping handle and housing a filter containing said dose of ground coffee powder, a coupling support in which said cup is coupled separately, and a pressing piston that is engageable in said filter for pressing said dose of ground coffee powder, wherein said pressing piston is configured to prevent the detachment of said pressed dose of ground coffee powder from walls of said filter when said pressing piston disengages said filter, wherein said support comprises a vertical cylindrical conveying conduit conveying said dose of ground coffee powder to said filter, wherein said pressing piston is positioned inside said vertical cylindrical conveying conduit and comprises a scraping perimeter gasket on the inner side of said vertical cylindrical conveying conduit.

13. The device according to claim 12, wherein said scraping perimeter gasket is configured to form a seal with the inner side of said vertical cylindrical conveying conduit and with the inner side of a cylindrical wall of side filter positioned on a downward axial extension of the inner side of said vertical cylindrical conveying conduit.

14. The device according to claim 12, further comprises a coffee grinder for coffee beans comprising a dispensing slide dispensing ground coffee having an outlet into said conveying conduit.

15. A device for preparing a dose of ground coffee powder ready for infusion, comprising:

a cup provided with a gripping handle and housing a filter containing said dose of ground coffee powder, a coupling support in which said cup is coupled separately, and a pressing piston that is engageable in said filter for pressing said dose of ground coffee powder, wherein said pressing piston is configured to prevent the detachment of said pressed dose of ground coffee powder from walls of said filter when said pressing piston disengages said filter, wherein the pressing piston further comprises:

a filtering element that is selectively permeable to the air but not to said ground coffee powder, wherein said filtering element comprises a flat support having a distribution of first holes and a mesh fixed to the flat support and having a distribution of second holes of a lesser dimension than the first holes.

16. The device according to claim 15, wherein said second holes have a diameter comprised between 0.05 mm and 0.20 mm.

* * * * *